(12) United States Patent
Mandre et al.

(10) Patent No.: US 7,743,024 B2
(45) Date of Patent: Jun. 22, 2010

(54) SYNCHRONISING CONTACTS

(75) Inventors: Indrek Mandre, Tallinn (EE); Teet Konnussaar, Tallinn (EE)

(73) Assignee: Skype Limited, Dublin 2 (IE)

( * ) Notice: Subject to any disclaimer, the term of this patent is extended or adjusted under 35 U.S.C. 154(b) by 312 days.

(21) Appl. No.: 11/799,317

(22) Filed: May 1, 2007

(65) Prior Publication Data

US 2008/0046478 A1 Feb. 21, 2008

(30) Foreign Application Priority Data

May 2, 2006 (GB) ................ 0608594.8

(51) Int. Cl.
*G06F 7/00* (2006.01)
*G06F 17/00* (2006.01)
(52) U.S. Cl. ............. 707/620; 709/203; 709/240
(58) Field of Classification Search ........... 707/1–10, 707/100–104.1, 200–206; 709/203, 240
See application file for complete search history.

(56) References Cited

U.S. PATENT DOCUMENTS

| 6,564,261 | B1 * | 5/2003 | Gudjonsson et al. ........ 709/227 |
| 2003/0056093 | A1 | 3/2003 | Huitema et al. |
| 2006/0042483 | A1 | 3/2006 | Work et al. |
| 2006/0067300 | A1 | 3/2006 | Poustchi et al. |

FOREIGN PATENT DOCUMENTS

EP 1 653 697 A1 5/2006

WO WO 02/25403 A2 3/2002

OTHER PUBLICATIONS

Yuting Zhang et al., A Novel Method for the Short Message or Multimedia Message Synchronization, Jul. 29-31, 2006, IEEE, 75-75.*
Bressier et al., A privacy enhanced service architecture for mobile users, Mar. 8-12, 2005, IEEE, 125-129.*
GB Search Report, GB0608594.8, date of search Nov. 28, 2007. All Pages.

* cited by examiner

*Primary Examiner*—Jean B Fleurantin
(74) *Attorney, Agent, or Firm*—Hamilton, Brook, Smith & Reynolds, P.C.

(57) ABSTRACT

A method of synchronizing the contact information of a group of users of a telephony system between the group of users over a communications network is provided. Each user of the group of users has a user terminal connected to the communications network and executes a client, the client comprising a contact information list. A first user belonging to the group of users selects the contact information of other users in the group from the contact information list and chooses to synchronize the contact information. An invitation message is transmitted from the client executed on the user terminal of the first user to the client executed on the user terminal of each of the other users in the group, the invitation message including an invitee list of users belonging to the group. The invitation message is received at the client of each of the other users in the group. At least one of the other users in the group accepts the invitation message, the step of accepting comprising generating an acceptance message, the acceptance message giving authorization to the group of users to contact the at least one other user, broadcasting the acceptance message to the group of users and adding the invitee list to the contact information list of the at least one user.

23 Claims, 21 Drawing Sheets

FIGURE S

SYNCHRONISING CONTACTS

RELATED APPLICATION

This application claims priority under 35 U.S.C. §119 or 365 to Great Britain Application No. GB 0608594.8, filed May 2, 2006. The entire teachings of the above application are incorporated herein by reference.

FIELD OF THE INVENTION

This invention relates to the synchronisation of contacts, particularly but not exclusively for use in a peer-to-peer telecommunications system.

BACKGROUND OF THE INVENTION

Peer-to-peer telecommunications systems allow the user of a device, such as a personal computer, to make telephone calls across a computer network such as the Internet. These systems are beneficial to the user as they are often of significantly lower cost than traditional telephony networks, such as fixed line or mobile networks. This may particularly be the case for long distance calls. These systems may utilise voice over internet protocol ("VoIP") over an existing network (e.g. the Internet) to provide these services, although alternative protocols can also be used. To use a peer-to-peer telephony service, the user must install and execute client software on their device. The client software provides the VoIP connections as well as other functions such as registration and authentication.

The client software executed on the device of the user displays a list a contacts that the user has stored. These contacts may be called using the peer-to-peer telecommunications system by selecting the contact and clicking on a "call" button using a pointing device. The client may also provide other means of communicating with the contact in the contact list, such as through chat messages or video calling. To enter a contact in the contact list, the user (referred to as user A in this example) must either know the username of the contact they wish to add (called user B in this example), or search for the contact using the full name (or other details such as email address). After finding the contact, user A can choose to add the contact of user B to their contact list. An invitation message is then transmitted to the user terminal of user B, stating that user A has added them to their contacts, thereby authorizing the user B to contact user A. User B can give user A authorization to contact them by accepting the invitation, or can prevent user A from contacting them by rejecting the invitation. If the invitation is accepted, the contact for user B is activated in user A's contact list, and user A will be able to view the status of user B (known as the contact's presence information). For example, user A will be able to see if user B's status is set to online, offline, do not disturb, or another status set by the contact.

SUMMARY OF THE INVENTION

A new user of the peer-to-peer telecommunications system may be unaware of the contact details of many people that he/she knows, and consequently these people are not added to the new user's contact list. It has been observed that a high proportion of users that start using a peer-to-peer telecommunications system, but then subsequently stop using it, only have a small number of contacts in their contact list. There is therefore a need to make it easier for users to obtain contacts of people they know, in order to enhance the user experience and to increase the level of usage of the peer-to-peer telecommunications system.

According to one aspect of the present invention there is provided a method of synchronising the contact information of a group of users of a telephony system between the group of users over a communications network, each user of the group of users having a user terminal connected to the communications network and executing a client, said client comprising a contact information list, the method comprising:

a first user belonging to the group of users selecting the contact information of other users in the group from the contact information list and choosing to synchronise the contact information;

transmitting an invitation message from the client executed on the user terminal of the first user to the client executed on the user terminal of each of the other users in the group, said invitation message including an invitee list of users belonging to the group;

receiving the invitation message at the client of each of the other users in the group; and at least one of the other users in the group accepting the invitation message, said step of accepting comprising generating an acceptance message, said acceptance message giving authorization to the group of users to contact the at least one other user, broadcasting said acceptance message to the group of users and adding the invitee list to the contact information list of the at least one user.

In one embodiment the step of transmitting the invitation message comprises: sending the invitation message to the client of each user in the group that is online; storing the invitation message at the client of each user that is online and has accepted the invitation; and forwarding the invitation message to the client of any user in the group that subsequently comes online from at least one of the clients storing the invitation or the first user.

In another embodiment the step of receiving further comprises the step of displaying the invitee list to each of the other users in the group. In another embodiment said invitation message further includes text information entered by the first user and said step of displaying further comprising displaying the text information to each of the other users in the group. In another embodiment the step of displaying further comprises the step of offering each of the other users in the group the choice to accept or refuse the invitation message. In another embodiment the method further comprises at least one user refusing the invitation message, said step of refusing comprising generating a refusal message and broadcasting the refusal message to the group of users.

In another embodiment the step of broadcasting the acceptance message comprises: sending the acceptance message to the client of each user in the group that is online; storing the acceptance message at the client of each user that is online and has accepted the invitation; and forwarding the acceptance message to the client of any user in the group that subsequently comes online from at least one of the clients storing the invitation or the at least one user.

In another embodiment the method further comprises the step of adding at least one new user to the group of users, said step of adding comprising: selecting at least one new user from the contact information list to add to the group of users; transmitting an invitation message to the at least one new user, said invitation message including a list of the users in the group of users; receiving the invitation message at the at least one new user, the at least one new user choosing to accept or refuse the invitation message, if the at least one user chooses to accept the invitation, broadcasting an acceptance message to the clients of the users of the group of users, wherein, upon receiving the acceptance message, the users of the group of users can choose to remain in the group of users with the at least one new user or leave the group of users; and if the at least one user chooses to refuse the invitation, broadcasting a refusal message to the users of the group of users.

In another embodiment the method further comprises the step of renaming the group of users, said step of renaming comprising entering a new name for the group of users in the client, broadcasting the new name to the client of each user of the group of users; and updating the name stored for the group in the contact information list.

In another embodiment the method further comprises the step of a user leaving the group of users comprising the leaving user selecting to remove the group from the contact information list; choosing whether to keep contacts of the users in the group of users in the contact information list or to remove the contacts of the users in the group of users; and broadcasting a leaving message to the client of each of the users of the group of users.

According to another aspect of the present invention there is provided a user terminal connected to a communications network and executing a client for synchronising the contact information of a group of users of a telephony system between the group of users over a communications network, said client comprising a contact information list, means for selecting the contact information of other users in the group from the contact information list, means for choosing to synchronise the contact information, and means for transmitting an invitation message from the client to a client executed on the user terminal of each of the other users in the group, said invitation message including an invitee list of users belonging to the group.

According to another aspect of the present invention there is provided a user terminal connected to a communications network and executing a client for synchronising the contact information of a group of users of a telephony system between the group of users over a communications network, said client comprising a contact information list, means for receiving an invitation message including an invitee list of users belonging to the group, and means for accepting the invitation message, wherein the means for accepting comprises means for generating an acceptance message, said acceptance message giving authorization to the group of users to contact the user of the user terminal, means for broadcasting said acceptance message to the group of users, and means for adding the invitee list to the contact information list.

According to another aspect of the present invention there is provided a system for synchronising the contact information of a group of users of a telephony system between the group of users over a communications network, each user of the group of users having a user terminal connected to the communications network and executing a client, said client comprising a contact information list, the system comprising:

a user terminal of a first user belonging to the group of users, wherein the client executed at the user terminal of the first user comprises means for selecting the contact information of other users in the group from the contact information list, means for choosing to synchronise the contact information, and means for transmitting an invitation message from the client executed on the user terminal of the first user to the client executed on the user terminal of each of the other users in the group, said invitation message including an invitee list of users belonging to the group; and a user terminal of at least one of the other users in the group, wherein the client executed at the user terminal of the at least one other users comprises means for receiving the invitation message, and means for accepting the invitation message, wherein the means for accepting comprises means for generating an acceptance message, said acceptance message giving authorization to the group of users to contact the at least one other user, means for broadcasting said acceptance message to the group of users, and means for adding the invitee list to the contact information list of the at least one other user.

In one embodiment the means for transmitting the invitation message comprises: means for sending the invitation message to the client of each user in the group that is online; means for storing the invitation message at the client of each user that is online and has accepted the invitation; and means for forwarding the invitation message to the client of any user in the group that subsequently comes online from at least one of the clients storing the invitation or the first user.

In another embodiment the means for receiving further comprises means for displaying the invitee list on the user terminal of the at least one other user in the group. In another embodiment said invitation message further includes text information entered by the first user and said means for displaying further comprising displaying the text information on the user terminal of the at least one other user in the group. In another embodiment the means for displaying further comprises means for offering the at least one other user in the group the choice to accept or refuse the invitation message. In another embodiment the user terminal of the at least one of the other users in the group further comprises means for refusing the invitation message, said means for refusing comprising means for generating a refusal message and means for broadcasting the refusal message to the group of users.

In another embodiment the means for broadcasting the acceptance message comprises: means for sending the acceptance message to the client of each user in the group that is online; means for storing the acceptance message at the client of each user that is online and has accepted the invitation; and means for forwarding the acceptance message to the client of any user in the group that subsequently comes online from at least one of the clients storing the invitation or the at least one user.

In another embodiment the client of each user of the group of users further comprises means for adding at least one new user to the group of users, said means for adding comprising: means for selecting at least one new user from the contact information list to add to the group of users; and means for transmitting an invitation message to the at least one new user, said invitation message including a list of the users in the group of users.

In another embodiment the client of the at least one new user comprises: means for receiving the invitation message at the at least one new user, the at least one new user choosing to accept or refuse the invitation message, if the at least one new user chooses to accept the invitation, means for broadcasting an acceptance message to the clients of the users of the group of users, wherein, upon receiving the acceptance message, the users of the group of users can choose to remain in the group of users with the at least one new user or leave the group of users; and if the at least one new user chooses to refuse the invitation, means for broadcasting a refusal message to the users of the group of users.

In another embodiment the client of each user of the group of users further comprises means for renaming the group of users, said means for renaming comprising means for entering a new name for the group of users in the client, means for broadcasting the new name to the client of each user of the group of users; and means for updating the name stored for the group in the contact information list.

In another embodiment the client of each user of the group of users further comprises means for leaving the group of users comprising means for selecting to remove the group from the contact information list; means for choosing whether to keep contacts of the users in the group of users in the contact information list or to remove the contacts of the users in the group of users; and means for broadcasting a leaving message to the client of each of the users of the group of users.

BRIEF DESCRIPTION OF THE DRAWINGS

For a better understanding of the present invention and to show how the same may be put into effect, reference will now be made, by way of example, to the following drawings in which:

FIG. 2A-F shows the process for setting up and sharing a group of contacts;

FIG. 3A-F shows the process for a member of the group to accept an invitation to join the shared group;

FIG. 4A-C shows the process for a member of the group to decline an invitation to join the shared group;

FIG. 5 shows a shared group invitation listed as an event;

FIG. 8A-B shows the process for leaving a shared group.

DETAILED DESCRIPTION OF THE INVENTION

Figure 1:
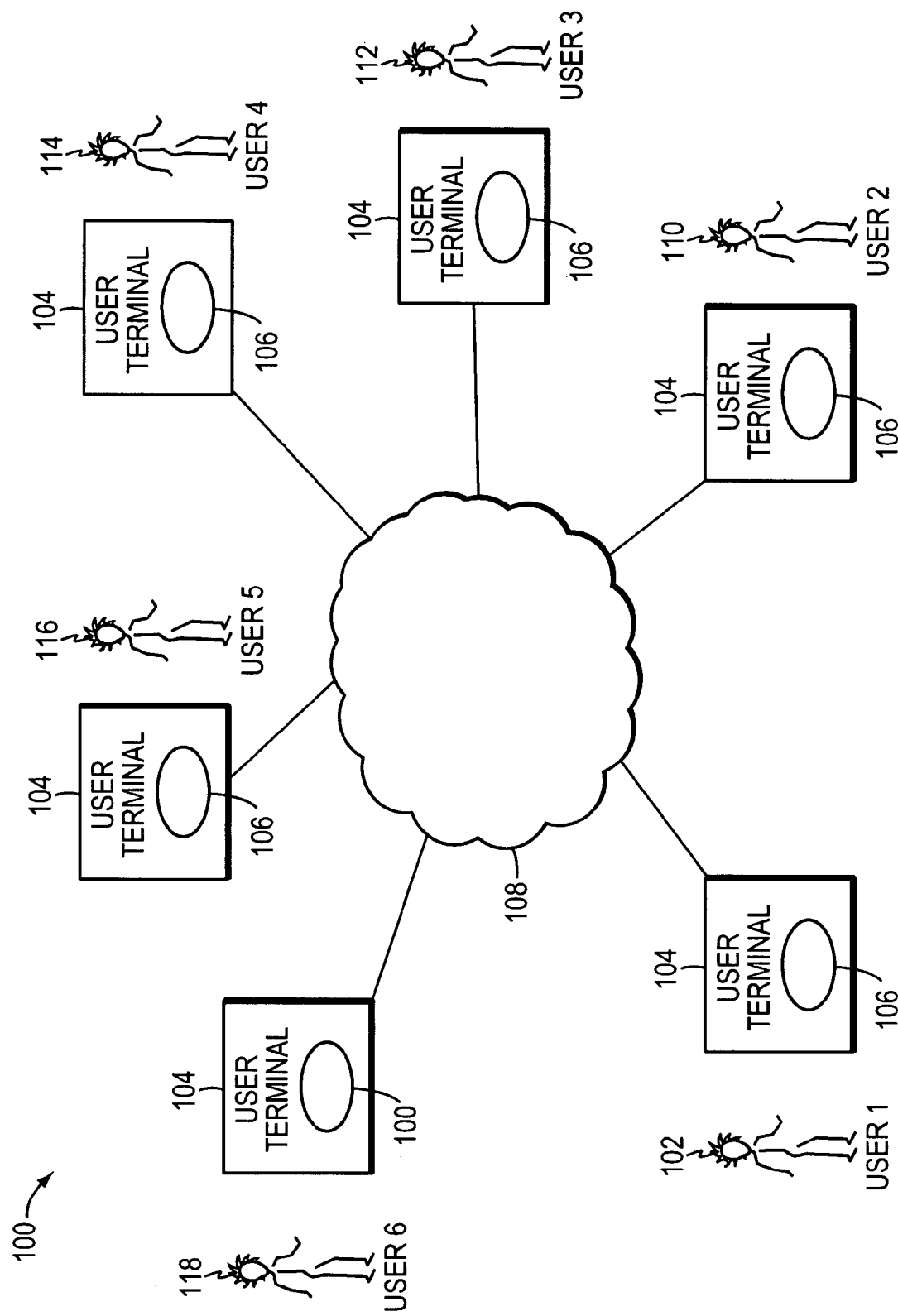
FIG. 1 shows users connected to a peer-to-peer telecommunications system.

Reference will first be made to FIG. 1, in which is shown an illustrative example of several users connected to a peer-to-peer telecommunications system 100. A first user 102 is operating a user terminal 104 on which is executed client software 106. The client software 106 enables the user 102 to make telephone calls across a communications network 108, which may be the Internet, to which the user terminal 104 is connected. The telephone calls may be made using VoIP, although alternative packet-based communication protocols may also be used.

A second user 110 is also shown operating a user terminal 104 that is executing client software 106. The user terminal and client software of the second user 110 may be similar to that of the first user 102. Also shown in FIG. 1 are third, fourth, fifth and sixth users (112-118), that are also operating user terminals 104 executing client software 106.

It is assumed that each of the users 2-6 (110-118) are known to the first user 102, for example that they all belong to a common interest group, or all know each other through a shared experience. As an illustrative example, the first user 102 and each of the users 2-6 (110-118) may have attended the same university. The first user 102 may remain in contact with all the users 2-6 (110-118), and the contact details for each of users 2-6 (110-118) are added in the contact list in the client software 106 of the first user 102. Therefore, the first user 110 is aware of the contact details for the users 2-6 (110-118), has been authorised by them and can readily contact them, and similarly, each of users 2-6 (110-118) are aware of the contact details of the first user 102, and can readily contact the first user 102.

However, the users 2-6 (110-118) are not necessarily aware of the contact details for each other, even though they have a shared common contact. For example, the second user 110 may not know the contact details of the fifth user 116, and vice versa.

It is therefore desirable for the contacts for a particular group of people to be able to be shared with all the members of the group. This permits the contact details of members of the group to be easily propagated to the whole group. This also helps new users obtain contacts for people that they know, by obtaining the contacts through common acquaintances, which increases the number of contacts in their contact list and may prevent the new users from stopping using the peer-to-peer telephony service.

This could be achieved by maintaining a central server for storing contact information that is shared between multiple users. This would act as a central repository of the shared contact information, and any member of the group could access this information. All the members of the group would therefore see the same contacts, regardless of whether any contacts were added or removed from the shared group. Whilst this is a simple way of maintaining synchronised group contact information, it has significant disadvantages. Firstly, the central servers need to be maintained by the operator of the telephony system, which is associated with increased cost. Secondly, a centralized server architecture may be more susceptible to reliability issues. A central server can act as a single point of failure, which can cause service disruption to the users. Many users attempting to access a single server simultaneously can also cause the server to respond slowly due to overloading, which can be detrimental to the user experience.

In light of these issues, a peer-to-peer technique is presented herein which enables the sharing of groups of contacts between members of a group. This avoids the disadvantages of a centralized server architecture, whilst keeping the details of the shared groups synchronised between all the members of the group in near real-time.

Figure 2A:
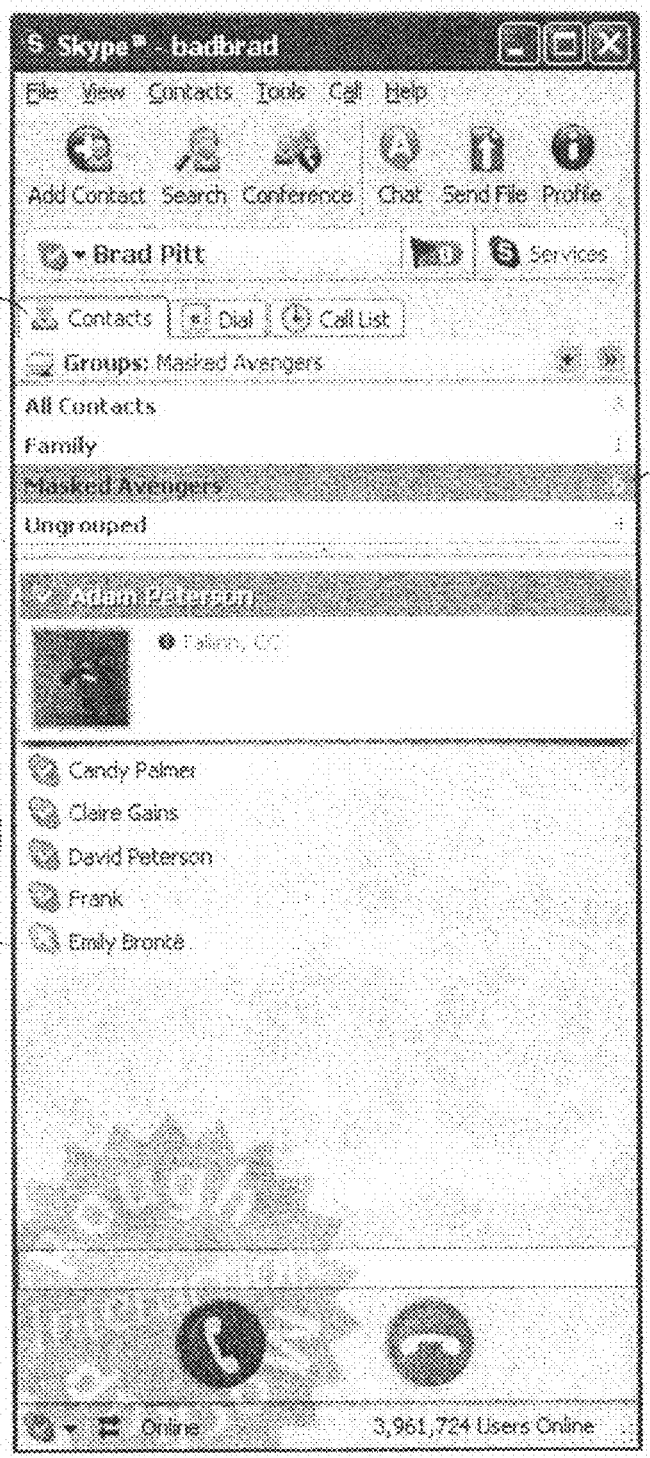

The process for setting up and sharing a group of contacts will now be described with reference to FIG. 2A-D. Reference is first made to FIG. 2A, which shows the user interface of the client 106, as presented to the user who is setting up the shared group. In the example shown here, the name of the user setting up and sharing the group of contacts is "Brad Pitt", who, in relation to the example given above in FIG. 1 corresponds to the first user 102.

The client user interface 202 comprises a tab labelled "contacts", and when this tab is selected the contacts in the contact list of the user are displayed. In the case of the example shown in FIG. 2A, the user has grouped his contacts according to a common feature, such as "family", and the groups are shown in the list of groups 204. In particular, the user has created a group made up of his close friends, which has been given the name "Masked Avengers" 206. When this group is selected by the user, the contacts contained within this group are shown in the contact list 208. The user wishes to share the contacts contained within this group with all the members of the group.

Figure 2B:
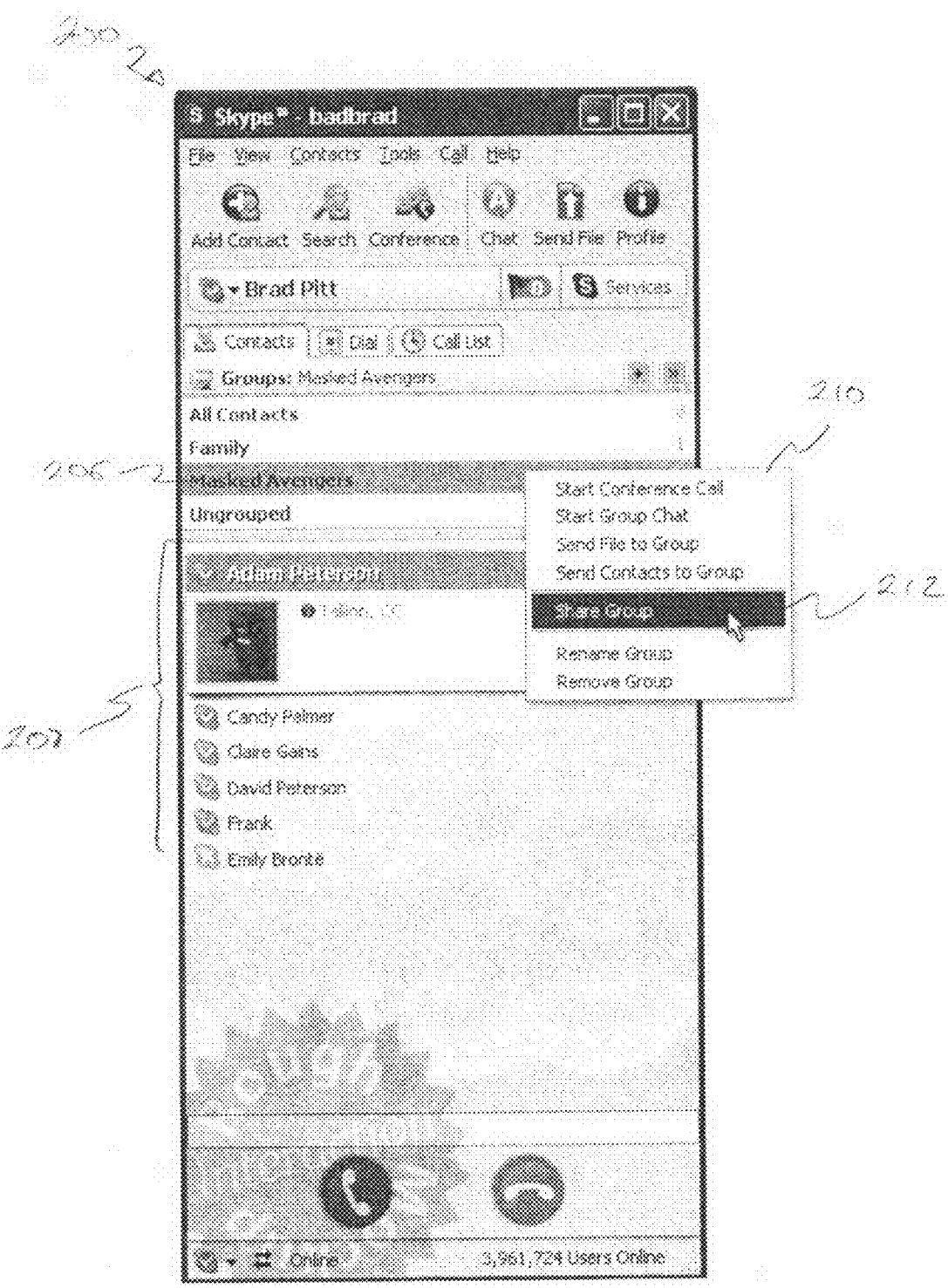

Reference is now made to FIG. 2B, which illustrates how the user can choose to share the group with the contacts within the group. The user can use his pointing device to "right click" (or similarly select) the chosen group 206, at which point a pop-up menu 210 appears in the user interface 200. One of the options within this menu is "Share Group" 212, which the user can select.

Figure 2C:
Figure 20:
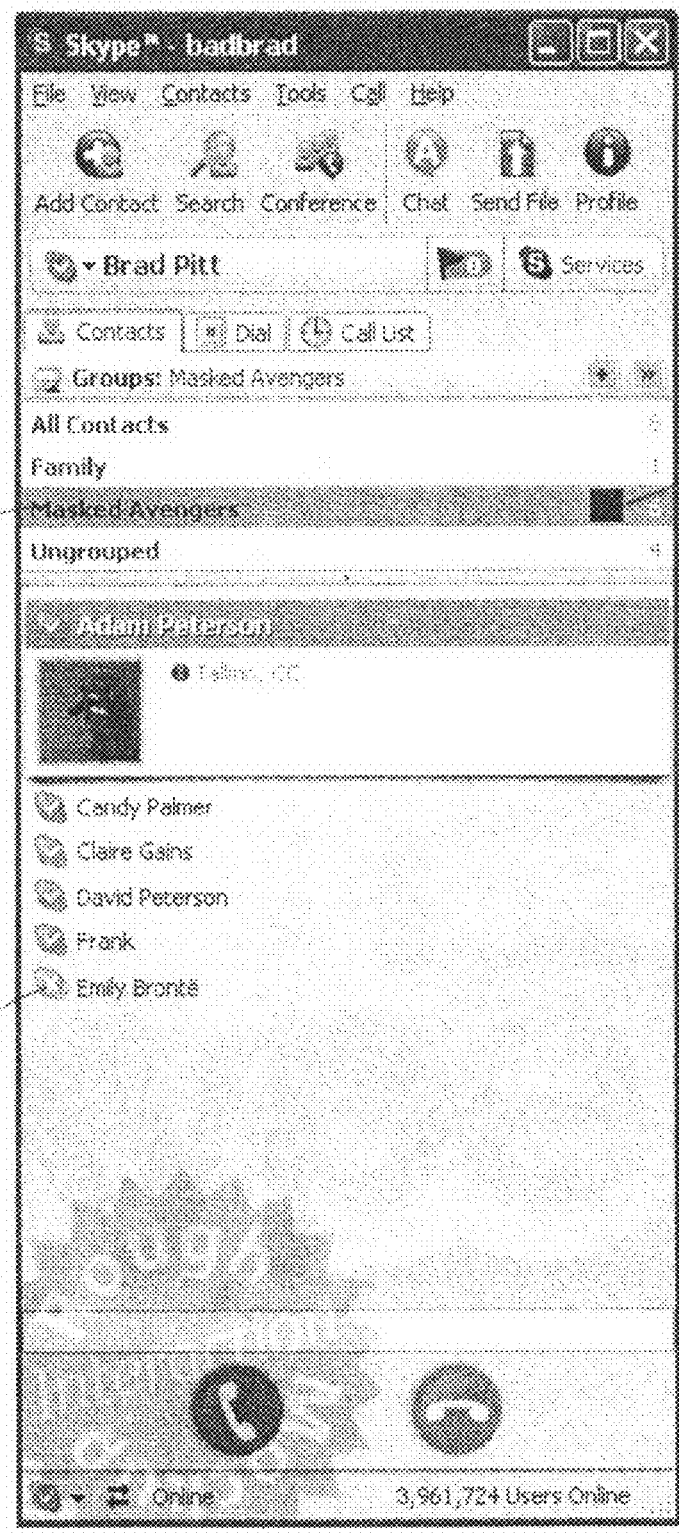

Upon selection of the menu item 212 a dialogue window 214 is shown to the user, as illustrated in FIG. 2C. The dialogue window 214 is used to create an invitation for all the group members to include this group in their own contact list.

The user may enter an invitation message in the field 216, and can review the contacts that are in the group and will be invited to join the shared group in the list 218. When the user is satisfied with the invitation, he can click the "OK" button 220.

The invitation is then transmitted to all the members of the group. The client 106 executed at the user terminal 104 of the user creates an invitation message that is transmitted over the communication network 108 to the client 106 of each of the members of the group. The invitation message is propagated to the members of the group by utilising the peer-to-peer structure of the system. For example, when a group is first set up, there is only one user that has joined the group (the initiating user) and the invitation message must be sent from the client of this user. Therefore, the client of the initiating user will keep trying to deliver the invitation to any group members that are online. However, once other members accept the invitation and join the group, then the user terminals of the members begin to relay messages as well. Therefore, at first, only the initiator of the group is sending invitations, but as group members join, they also begin sending invitations to any group members that they can see. A result of this is that although the invitation message is created initially by the initiator of the group, a member of the group may actually receive the invitation message from one of the other members due to it being relayed. This invitation message informs the clients of the group members that a user wishes to share a contact group of which they are a member, as will be described presently. After transmitting the invitation, the user interface 200 of the user has changed as shown in FIG. 2D, such that the user can see the group "Masked Avengers" 206 is marked with a shared group icon 222.

Figure 2E:
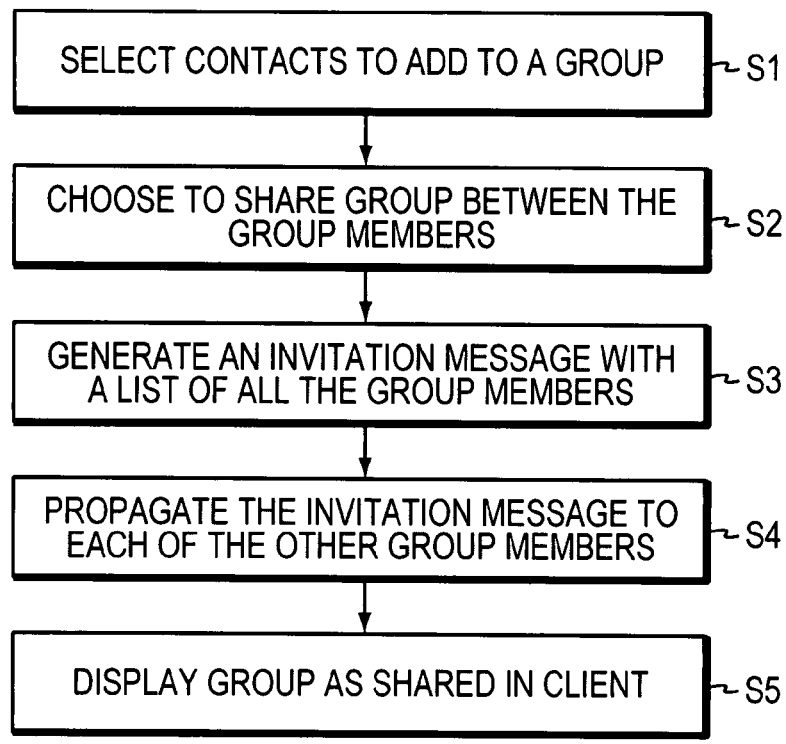

FIG. 2E shows a flowchart summarizing the process of creating a shared group of users. In step S1, the user creating the group selects a set of contacts to be grouped, and in step S2, user chooses to share this group with all the members of the group. Then, in step S3, an invitation message is created, which includes a list of all the group members, and the invitation message is propagated to the group members in step S4. Finally, in step S5 the group is displayed as shared in the client of the user.

Figure 2F:
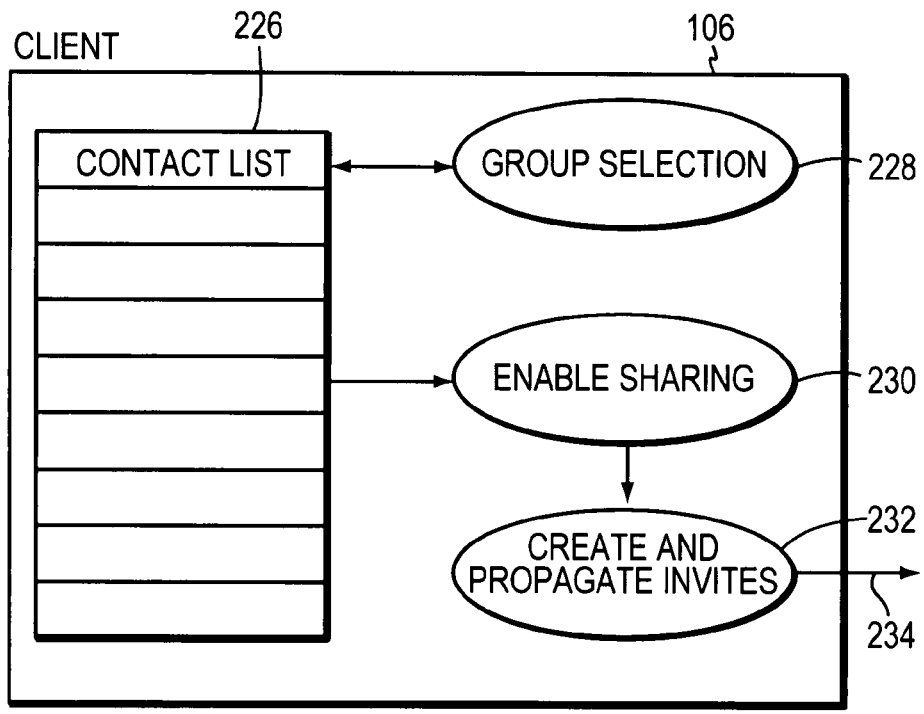

FIG. 2F illustrates a pictorial representation of the processes performed in the client 106 executed on a user terminal 104 when a shared group is created. The client 106 comprises a contact list 226 in which the contacts to be grouped are stored. The contact list 226 is available to a process 228 for selecting the contacts to be grouped, and the information on the grouped contacts can be returned and stored in the contact list 226. The groups in the contact list 226 can be accessed by a process 230 for enabling the group to be shared. The sharing of a group leads to another process 232 for creating the invitation messages to the group of users and propagating the message outside the client 106, indicated by arrow 234.

Figure 3A:
Figure 36:
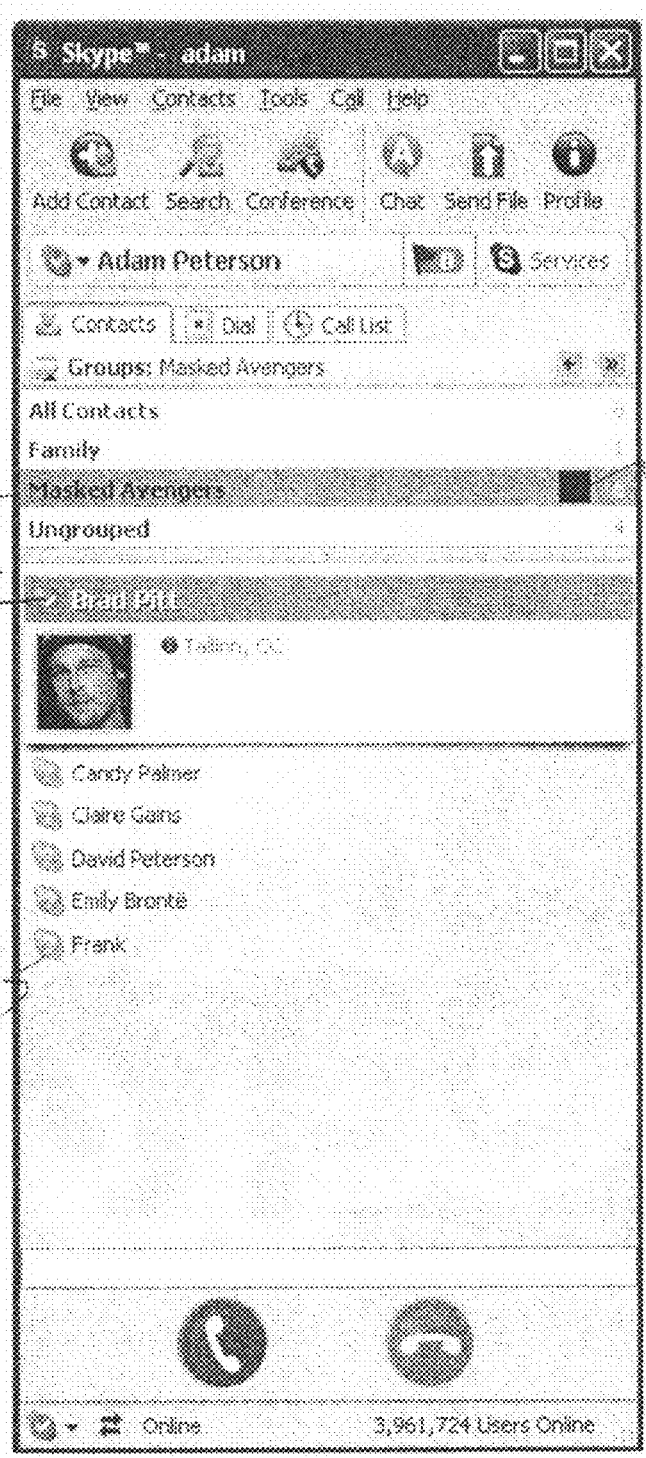

Reference is now made to FIGS. 3A-D, which show the process for a member of the group to accept the invitation to join the shared group. In the example shown in FIG. 3A-D, "Adam Peterson" is one of the contacts in "Brad Pitt's" "Masked Avengers" group. With reference to FIG. 3A, Adam Peterson receives the shared group invitation over the communication network 108 at the client, and the invitation window 300 is displayed. Adam Peterson can view the message 302 from the user sending the invitation (as entered in the dialogue window shown in FIG. 2C) and a list of the other group members 304. If Adam Peterson is content to join the shared group with the list of group members 304, then he can click "OK" 306. By clicking "OK" Adam Peterson is adding the group (and all of its contacts) to his contacts list, and, in doing so, he is authorizing all the other group members to be able to contact him. However, Adam Peterson will not be able to contact the other members of the group until they have also accepted the invitation (and hence authorised the group members to contact them). A message confirming that the user Adam Peterson has accepted the invitation is broadcast to all the members of the group. The broadcast acceptance message is propagated to the members using a peer-to-peer relaying method, such that the message may be relayed from one member to another, in order to distribute the message to all the group members. This is achieved by the creator of the message sending the message to the members that he can see online, and the recipients of the message then relaying the message on to any members that they can see online, and so on until the message has been broadcast to all members of the group.

FIG. 3B shows the client user interface 308 for the user Adam Peterson after he has accepted the invitation to join the group. In his contact list, Adam Peterson now sees the new shared group 310 listed, and an icon 312 next to the group which indicates that the group is shared. When the group is selected, the contacts in the group are displayed in the list 314.

If, for example, Adam Peterson is the first person to accept the invite to join the group, then all the other members are indicated as pending (indicated by the question mark status icon 316) except Brad Pitt who was already in the contact list of Adam Peterson, and has previously been authorised by Brad Pitt (indicated by the tick status icon 318).

Figure 3C:
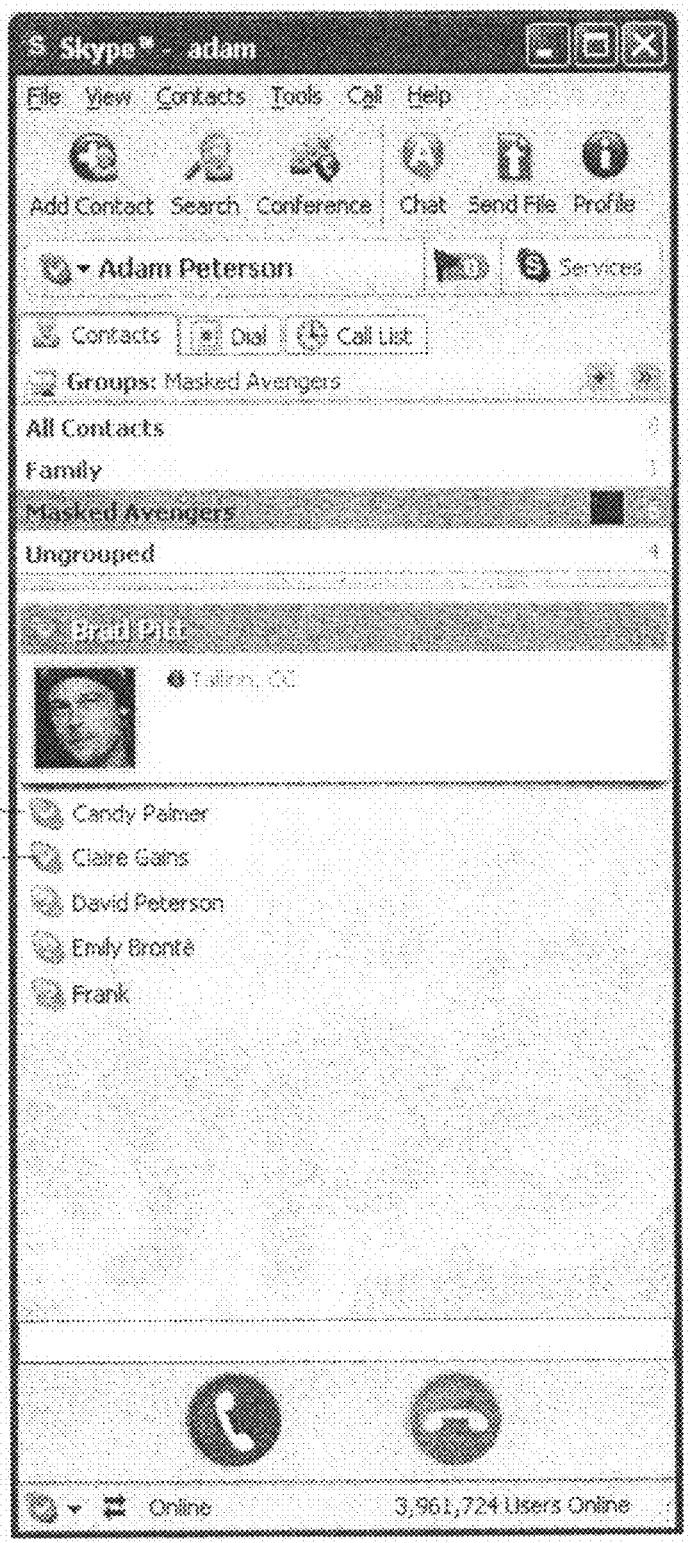
Figure 30:
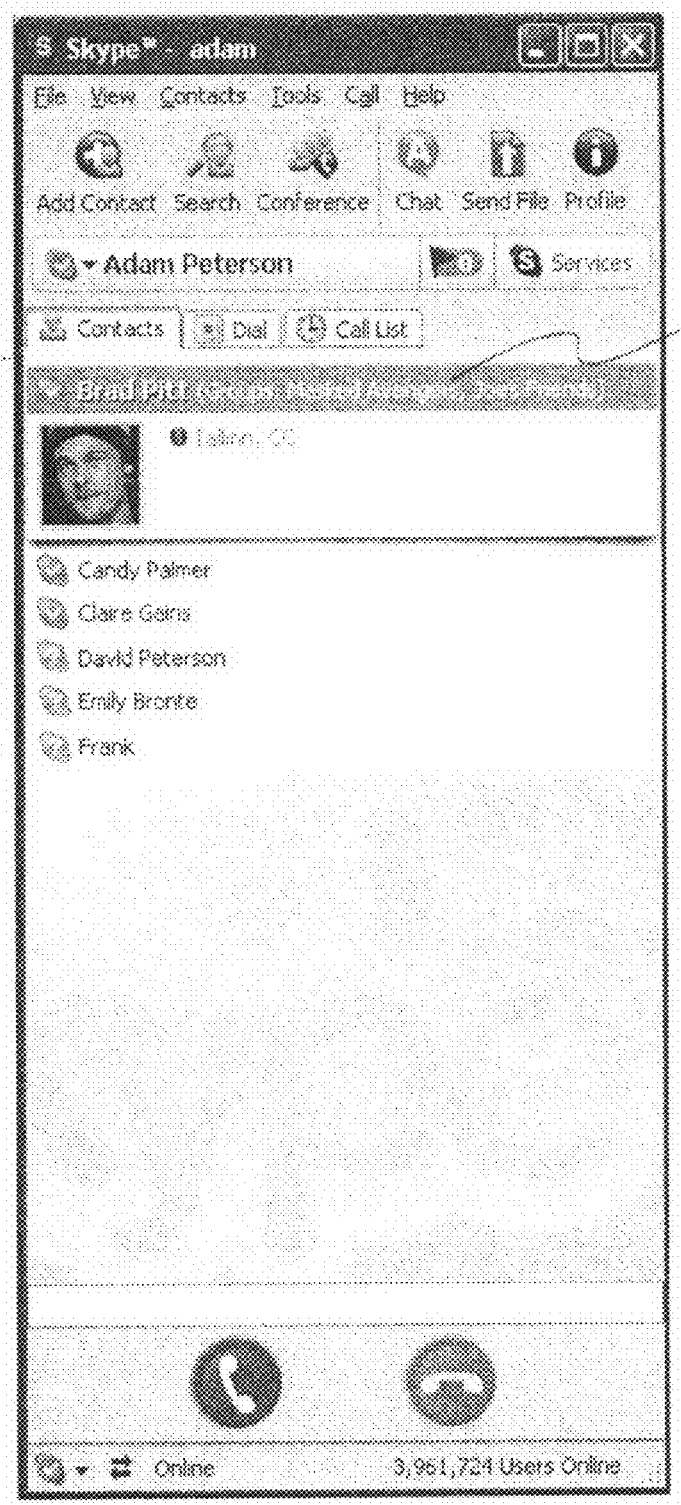

As other members of the group accept the invitation, their indications change in the contact list. For example, FIG. 3C shows the case where the users "Candy Palmer" and "Claire Gains" have accepted the invitation, and their indications 320, 322 have changed such that Adam Peterson can see their online status.

FIG. 3D shows an alternative view that can be presented to Adam Peterson, if he does not wish to view his contacts by groups. In this case all his contacts are simply shown in a list 324, but if a contact is selected that belong to a group, then this indicated to the user with the message 326.

Figure 3E:
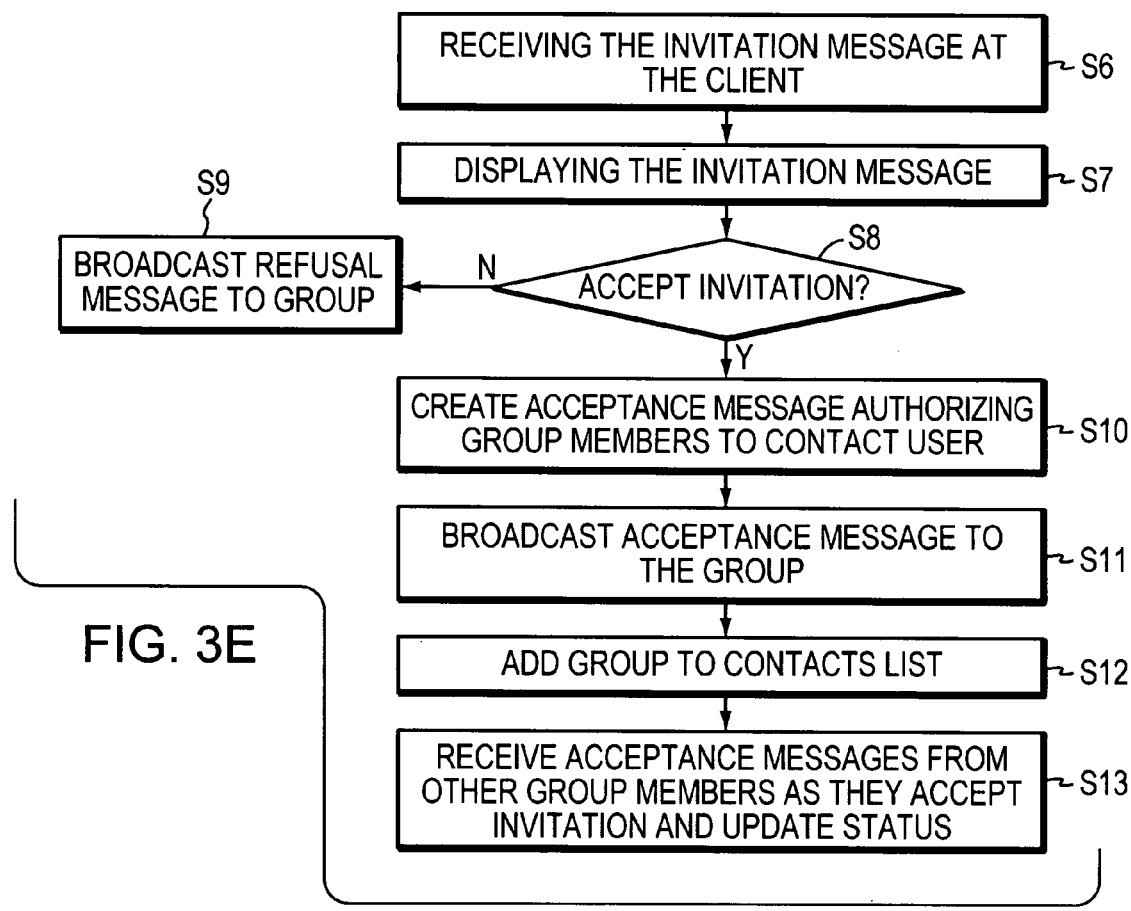

FIG. 3E shows a flowchart summarizing the process for a member of the group to accept the invitation to join the shared group. In step S6, the client of the user receives the invitation message inviting the user to join the shared group, and the invitation message is displayed to the user in step S7. At step S8, the user has the option of accepting or rejecting the invitation. If the user rejects the invitation, then in step S9 a refusal message is broadcast to the group of users (as discussed in more detail below). If the user accepts the invitation, then in step S10, the client creates an acceptance message to authorize the members of the group to contact the user. In step S111, the acceptance message is broadcast to all the members of the group. In step S112, the group is added to the contacts list of the user. As other members of the group accept the invitation message, the user receives other acceptance messages from other group members, and updates their status in the contact list.

Figure 3F:
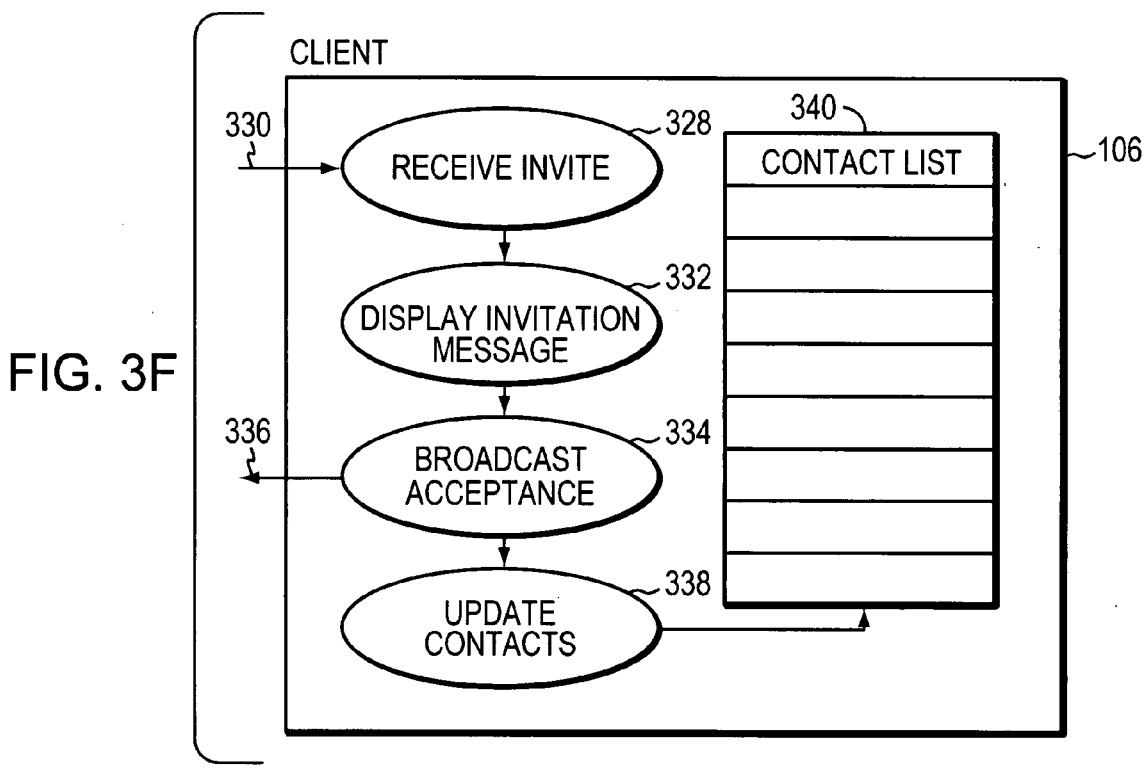

FIG. 3F illustrates a pictorial representation of the processes performed in the client 106 executed on a user terminal 104 when an invitation to join a shared group is accepted. The client 106 has a process 328 for receiving invitations from outside the client 106, as indicated by arrow 330, and a process 332 for displaying the invitation message to the user. The client 106 generates the acceptance message and broadcasts it with a process 334 to external group members, indicated by arrow 336. The client 106 comprises a contact list 340 which is updated to store the accepted group with process 338.

Figure 4A:
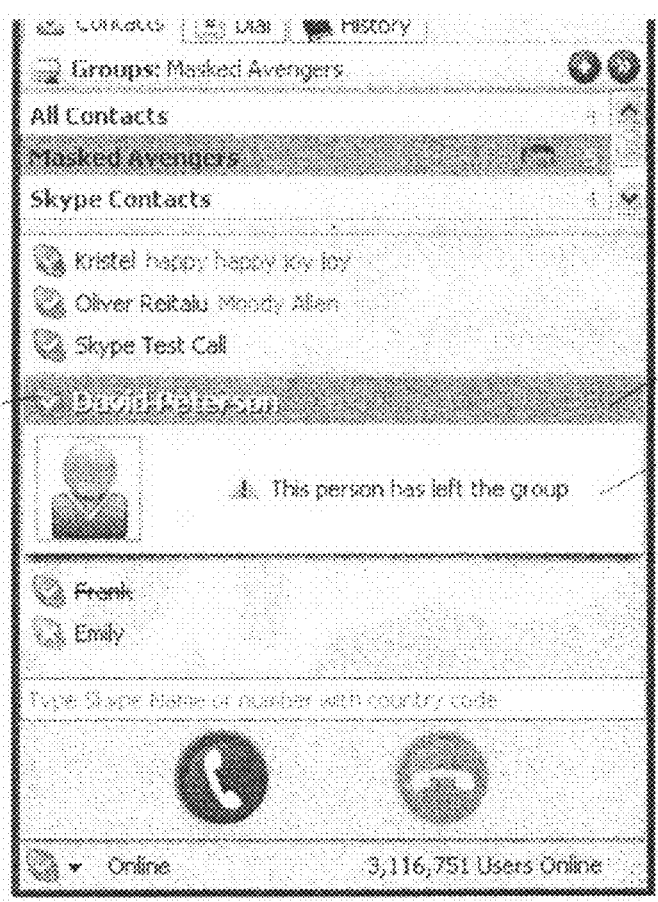
Figure 4C:
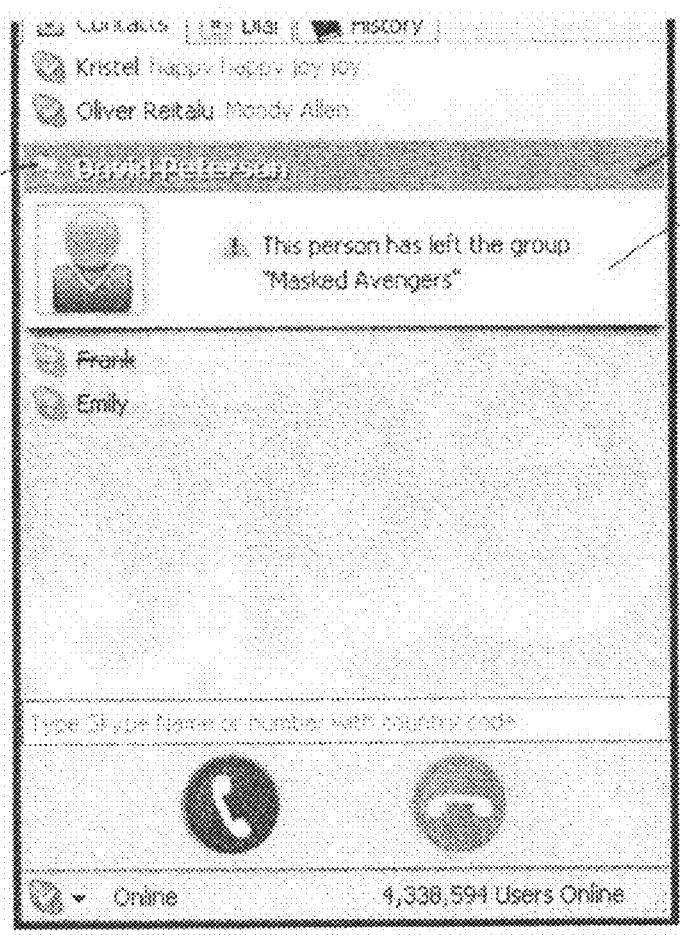

Reference is now made to FIG. 4A-C, which illustrates the process when a user declines the invitation to join a group. Group members are displayed in the contact list of a group shown in the client as "pending" (see for example 316 in FIG. 3B) until they either accept the invitation (in which case their online status is then displayed) or they decline the invitation (in which case they are removed from the group).

FIGS. 4A-C show the case where a user "David Peterson" has declined the invitation to join the shared group. When a user declines the invitation to join the group their contact is displayed to all other group members as "struck-through" so other members can see that they have left the group. The decision of the user to decline the invitation is communicated to the other members of the group by the transmission of a refusal message. When a user declines an invitation to join the group, the refusal message is first transmitted from the declining user (e.g. David Peterson) to the user from which he received the invitation, and following that a refusal message is then broadcast to all members of the group using the peer-to-peer relaying technique. A struck-through contact remains in the group contact list view until the user has viewed that group and selected at least one of the struck through contacts (in order that they have read the text "This person has left the group"). The struck-through contact is then removed from the group contact list view after, for example, 2 minutes.

FIG. 4A shows the user interface of the client 200 for the user "Brad Pitt" who sent the invitation to join the group. The contact for David Peterson 402 is shown struck-through, and when selected the contact displays the message "This person has left the group" 404. Note that "Brad Pitt" can still see the online status of David Peterson, as indicated by the icon 406, as David Peterson remains in the contact list of Brad Pitt (David Peterson must have already been in the contact list of Brad Pitt to be invited to join the shared group initially). Therefore, although David Peterson has left the group, he may still be contacted by Brad Pitt.

FIG. 4B shows the user interface of the client 308 for the user "Adam Peterson", who is a member of the group, but does not have the contract details for "David Peterson". The contact for David Peterson 408 is shown struck-through, and when selected the contact displays the message "This person has left the group" 410. As "Adam Peterson" did not have the contact details for David Peterson and has therefore never been authorised by David Peterson, his status is shown as pending, as indicated by the question mark icon 412.

FIG. 4C shows a similar user interface to that shown in FIG. 4B, but in this case Adam Peterson has chosen not to view his contacts by groups (similar to that shown in FIG. 3D above). The contact for David Peterson 414 is again shown struck-through, and when selected the contact displays the message "This person has left the group Masked Avengers" 416. As mentioned above, in this example, "Adam Peterson" did not have the contact details for David Peterson and has therefore never been authorised by David Peterson, his status is shown as pending, as indicated by the question mark icon 418.

If a member of the group is offline when the invitation to join the shared group is sent (as is the case, for example, for the user "Emily Brontë" shown in FIG. 2D, as indicated by the "X" icon 224) then the invitation will be stored separately by all the members of the group. When the client of one of the members sees the offline user come online (i.e. as soon as she launches the client software and signs in to the peer-to-peer telephony system) they will deliver the invitation.

If a member of the group has their status set to "do not disturb" when the invitation to join the shared group is sent, then the group member will not be shown the invitation window. Rather the shared group invitation will be listed as an "event" in the client software. "Events" are a record of occurrences which the user was not able to act upon, such as missed voice calls. Events that have occurred are displayed listed in the client software. An example of a shared group invitation listed as an event is shown illustrated in FIG. 5.

Once a shared group has been established, it is possible to add new members to the group. Any one of the group members can add any other contact to the group. However, any changes to the members of the shared group must be kept synchronised between all the members of the group.

A group member can add a contact to the group by selecting a contact and dragging it into the group displayed in the client. When a group member drags another contact into the group, they will be prompted that this is a shared group and that the contact will appear in all member's contact lists, as is shown illustrated in FIG. 6A. In the example shown in FIG. 6A the new user "Sarah Peterson" has been added to the shared group.

Figure 6B:
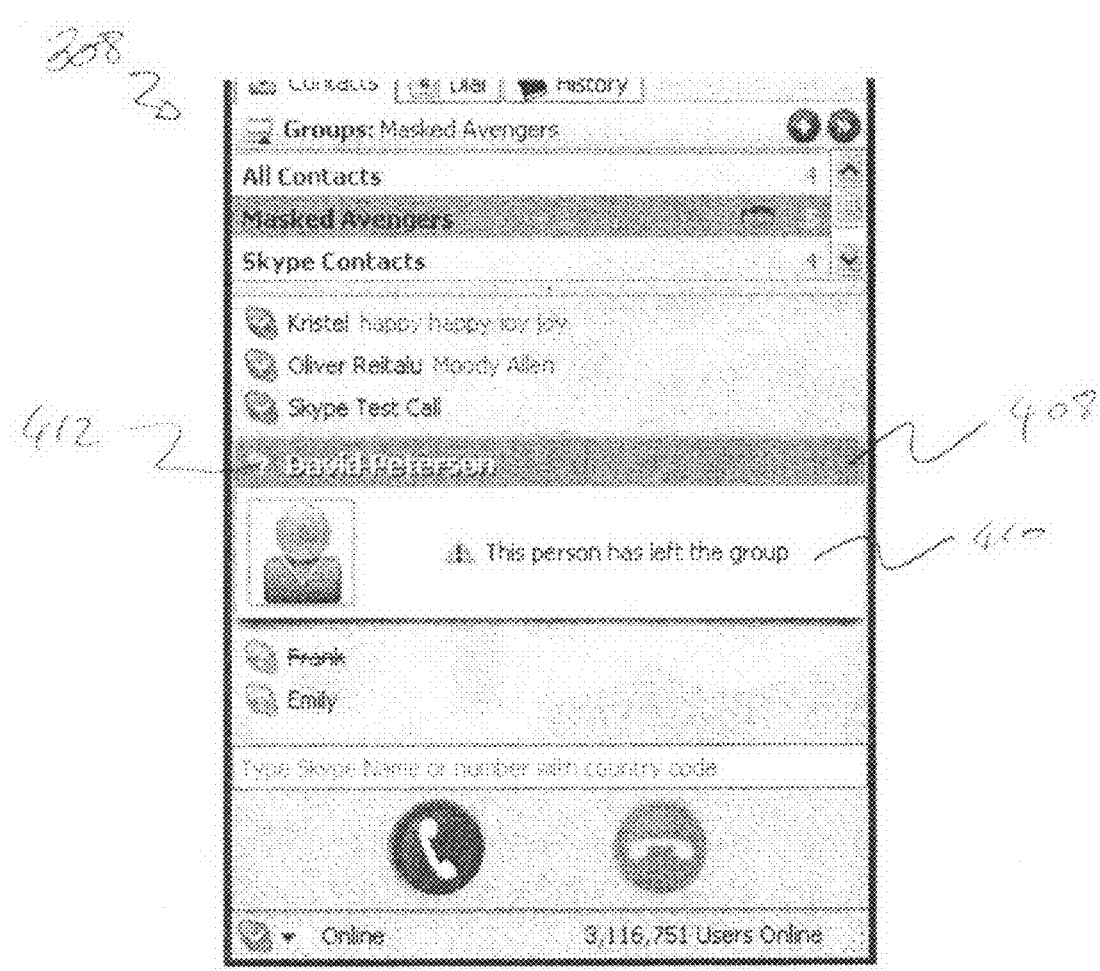
FIG. 6A-E shows the process for adding a new member to a shared group.
Figure 6A:
Figure 6B:
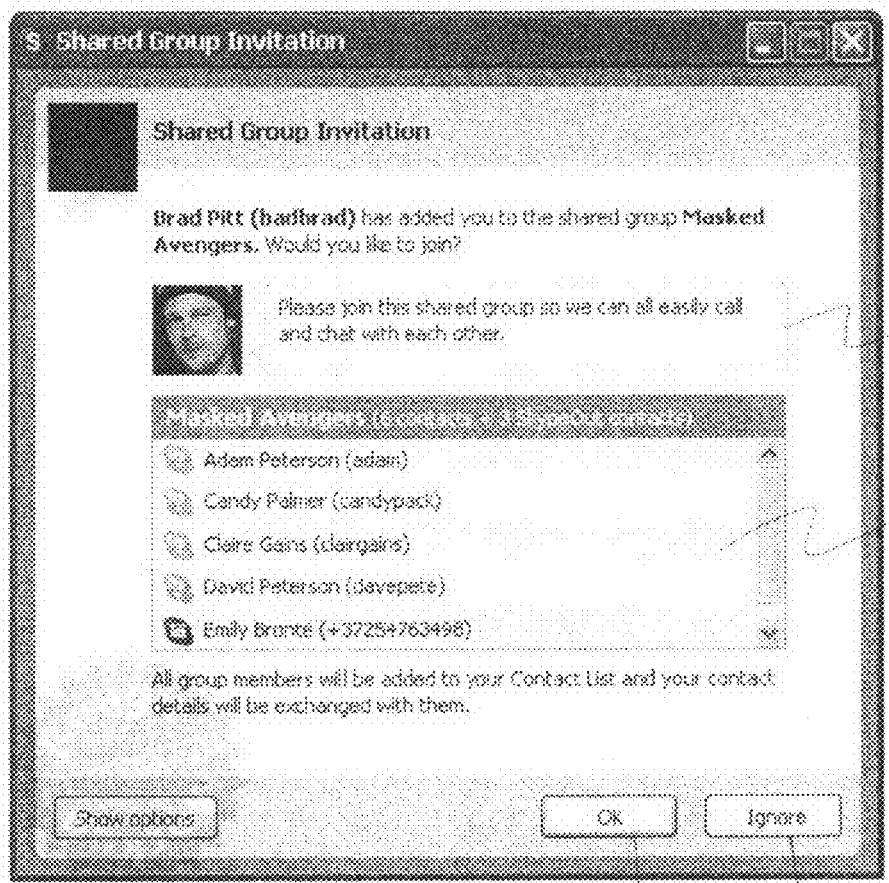
Figure 6C:

The new member ("Sarah Peterson") receives an invitation to join the shared group, as illustrated in FIG. 6B. The invitation comprises a message 602 from the person adding the new user to the group and is shown a list of members 604 of the group. The invitation is the same as that discussed previously for initiating a new group. The invitation is also propagated in the same way as the invitation message for a new group, in that it is broadcast to all members and relayed between the members of the group in a peer-to-peer manner until it reaches the new user. Therefore, the new user Sarah Peterson may actually receive the invitation from one of the other members of the group, due to the relaying of the invitation, and not from the person adding the new member. The new user can accept the invitation by clicking the "OK" button 606 or declining the invitation by clicking the "Ignore" button 608. By accepting the invitation the new user is authorizing all the other group members to contact her. An acceptance message is broadcast from the new user in the same manner as outlined previously for the case of creating a new group. The addition of the new user happens in near real-time, such that the new user becomes part of the group as soon as the invitation has been accepted.

All the existing group members will receive the acceptance message from the new user, and upon receiving the acceptance message a notification dialogue window 610 will be displayed to the group members. The group members have the option of accepting the new user into the group by clicking the "OK" button 602, or they have the option to leave the group if they are not happy with sharing their contact details with that person by clicking the "leave group" button 604. By accepting the new user, the group members are authorizing the new user to contact them.

Figure 6D:

It is also possible to add multiple users to the group at one time. Any group member can do this by selecting multiple contacts and dragging them into the group displayed on the client of the group member. The group member adding the multiple contacts will be presented with a message such as that shown in FIG. 6D. A single invitation message is created by the user adding the new users, which lists all the new users added. This is similar to the message created when a group is initially set up and is propagated in the same way.

Figure 6E:

A user can also be added to the group who is not a user of the peer-to-peer telephony system, but is instead a user of another telecommunications system, such as the public switched telephone network ("PSTN") or a mobile communications network. This type of contact is known as a "SkypeOut" contact. When this type of contact is added to the group the group member adding the "SkypeOut" contact is displayed a message such as that shown in FIG. 6E.

A user may also be automatically prompted to share a group under certain circumstances. If a user is organising their contacts by placing them into particular groups, the user can be notified of the possibility of sharing the group once a predetermined number of users have been added to the group. For example, if the user has added four contacts to a group, then the user may be prompted with the message "Shared groups are a simple new way to share contacts with your friends, family or co-workers. Learn more". This can educate users as to the shared groups feature and encourage its uptake.

Figure 7:
FIG. 7 shows a dialogue box confirming a change of name of the group.
Figure 7A:
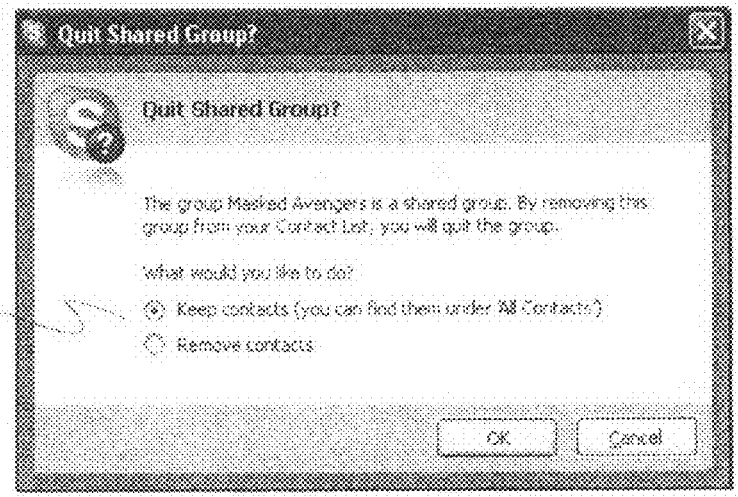
Figure 7B:
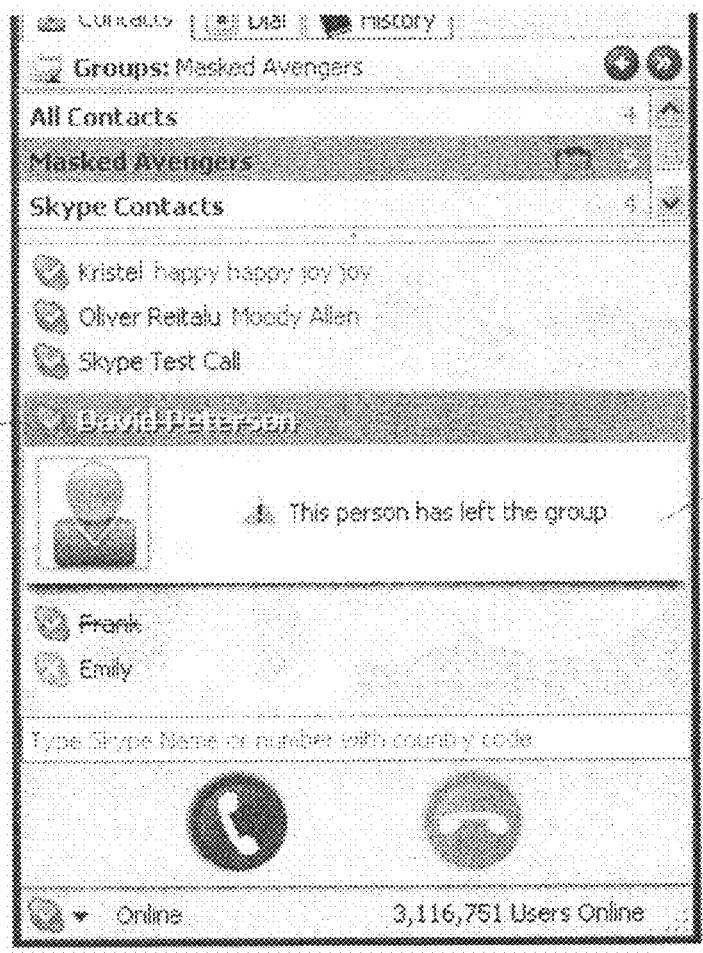

When a shared group is created the name of the group is determined by the user creating the shared group, however the name of the group may be changed by any member of the group once it has been established. If a member of the group attempts to change the name of the group they will be presented with a dialogue box 700 such as that shown in FIG. 7. In this example a group member is changing the name of the group to "My less gifted friends". By clicking on the "OK" button 702 in the dialogue box 700, the name is changed, and the change of name is propagated to all the members of the group. This is achieved by the client executed on the user terminal of user that is changing the name broadcasting a message to the client of each of the other members of the group. The broadcasting of the message is performed using the peer-to-peer relaying technique discussed hereinbefore. Each of the members of the group store the most recent name used and distribute it to everyone else in the group (and any new members). The clients at each of the other group members then update the name stored for the shared group in order to remain synchronised with each other. Consequently, the changed name will be shown in the clients of all the members of the group, and the change of name happens in near real-time.

Any member of the group can choose to remove the group from their contact list, and hence leave the shared group. If a member of the group attempts to do this they are displayed a dialogue box 800 show in FIG. 8A. The dialogue box 800 gives the user two options 802. The user can either keep the contacts that were members of the group in their contact list (although these will no longer be affiliated with the group), or the user can choose to remove all the contacts from the group from their contact list. When a user leaves the group he sends out one last broadcast message to the group notifying the group that he is leaving. This message is propagated amongst the group members using the peer-to-peer technique outlined previously.

When a user removes a shared group from their contact list that user appears "struck out" in the contact list of the other members of the group. For example, FIG. 8B shows the contact list of another member of the group after the contact David Peterson has removed the group from his contact list. The contact for David Peterson 804 is therefore shown struck out and is displayed along with the message 806 "This person has left the group". The removal of a user from a shared group happens in near real-time, such that the user is removed from the shared group shown in the client of each of the group members as soon as the user removing himself selects one of the options 802 from FIG. 8A, and confirms the removal of the group from their contact list.

The shared group of contacts may be used to establish an instant messaging chat between all the members of the group (known as a "multichat"). The group members can then communicate with each other using the multichat, and the messages exchanged are visible to all the members of the group. When the multichat is initially started the name of the shared group is used as the "topic" shown in the multichat display. If any new users are added to the group, then they are automatically added to the multichat. Similarly, any users that leave the group automatically leave the multichat. Users are not able to leave the chat without leaving the group, but the users are able to "silence" the messages from the multichat, so that they are not disturbed by the messages.

The above description outlines a technique by which a group of contacts can be shared between the members of the group, and kept synchronised with each other, such that changes to group (e.g. new members, the removal of members, or a change of name) are reflected across all the members of the group in near real-time. In particular, this is achieved using a peer-to-peer architecture in which the shared contact groups are kept synchronised without the use of a centralized server architecture, thereby avoiding the expense of maintaining a centralized server and avoiding a single point of failure.

While this invention has been particularly shown and described with reference to preferred embodiments, it will be understood to those skilled in the art that various changes in form and detail may be made without departing from the scope of the invention as defined by the appendant claims.

What is claimed is:

1. A method of synchronising the contact information of a plurality of users of a telephony system between the plurality of users over a communications network, each user of the plurality of users having a user terminal connected to the communications network and executing a client, said client comprising a contact information list, the method comprising:
    a first user belonging to the plurality of users selecting the contact information of other users in the plurality of users from the contact information list and choosing to synchronise the contact information by generating an invitation message, including an invitee list of users belonging to the plurality of users;
    transmitting the invitation message from the client executed on the user terminal of the first user to the client executed on the user terminal of each of the other users in the plurality of users;
    receiving the invitation message at the client of each of the other users in the plurality of users; and
    at least one of the other users in the plurality of users accepting the invitation message, said step of accepting comprising generating an acceptance message, said acceptance message giving authorisation to the plurality of users to contact the at least one other user, broadcasting said acceptance message to the plurality of users and adding the invitee list to the contact information list of the at least one user, thereby synchronising the contact information of the plurality of users of the telephony system.

2. A method according to claim 1, wherein the step of transmitting the invitation message comprises: sending the invitation message to the client of each user in the plurality of users that is online; storing the invitation message at the client of each user that is online and has accepted the invitation; and forwarding the invitation message to the client of any user in the plurality of users that subsequently comes online from at least one of the clients storing the invitation or the first user.

3. A method according to claim 1, wherein the step of receiving further comprises the step of displaying the invitee list to each of the other users in the plurality of users.

4. A method according to claim 3, wherein said invitation message further includes text information entered by the first user and said step of displaying further comprising displaying the text information to each of the other users in the plurality of users.

5. A method according to claim 3, wherein the step of displaying further comprises the step of offering each of the other users in the plurality of users the choice to accept or refuse the invitation message.

6. A method according to claim 5, further comprising at least one user refusing the invitation message, said step of refusing comprising generating a refusal message and broadcasting the refusal message to the plurality of users.

7. A method according to claim 1, wherein the step of broadcasting the acceptance message comprises: sending the acceptance message to the client of each user in the plurality of users that is online; storing the acceptance message at the client of each user that is online and has accepted the invitation; and forwarding the acceptance message to the client of any user in the plurality of users that subsequently comes online from at least one of the clients storing the invitation or the at least one user.

8. A method according to claim 1, further comprising the step of adding at least one new user to the plurality of users, said step of adding comprising:
  selecting at least one new user from the contact information list to add to the plurality of users;
  transmitting an invitation message to the at least one new user, said invitation message including a list of the users in the plurality of users;
  receiving the invitation message at the at least one new user, the at least one new user choosing to accept or refuse the invitation message,
  if the at least one user chooses to accept the invitation, broadcasting an acceptance message to the clients of the users of the plurality of users, wherein, upon receiving the acceptance message, the users of the plurality of users can choose to remain in the plurality of users with the at least one new user or leave the plurality of users; and
  if the at least one user chooses to refuse the invitation, broadcasting a refusal message to the users of the plurality of users.

9. A method according to claim 1, further comprising the step of renaming the plurality of users, said step of renaming comprising entering a new name for the plurality of users in the client, broadcasting the new name to the client of each user of the plurality of users; and updating the name stored for the plurality of users in the contact information list.

10. A method according to claim 1, further comprising the step of a user leaving the plurality of users comprising the leaving user selecting to remove the plurality of users from the contact information list; choosing whether to keep contacts of the users in the plurality of users in the contact information list or to remove the contacts of the users in the plurality of users; and broadcasting a leaving message to the client of each of the users of the plurality of users.

11. A user terminal connected to a communications network and executing a client for synchronising the contact information of a plurality of users of a telephony system between the plurality of users over the communications network, said client comprising a contact information list, means for selecting the contact information of other users in the plurality of users from the contact information list, means for choosing to synchronise the contact information, means for generating an invitation message, including an invitee list of users belonging to the plurality of users, and means for transmitting the invitation message from the client to a client executed on the user terminal of each of the other users in the plurality of users for accepting and storing the invitation message and giving authorisation to the plurality of users to contact each of the other users, thereby synchronising the contact information of the plurality of users of the telephony system.

12. A user terminal connected to a communications network and executing a client for synchronising the contact information of a plurality of users of a telephony system between the plurality of users over the communications network, said client comprising a contact information list, means for receiving an invitation message from a client executed on the user terminal of one of the other users in the plurality of users, the invitation message including an invitee list of users belonging to the plurality of users, means for accepting the invitation message, and means for storing the invitation message wherein the means for accepting comprises means for generating an acceptance message, said acceptance message giving authorisation to the plurality of users to contact the user of the user terminal, means for broadcasting said acceptance message to the plurality of users, and means for adding the invitee list to the contact information list, thereby synchronising the contact information of the plurality of users of the telephony system.

13. A system for synchronising the contact information of a plurality of users of a telephony system between the plurality of users over a communications network, each user of the plurality of users having a user terminal connected to the communications network and executing a client, said client comprising a contact information list, the system comprising:
  a user terminal of a first user belonging to the plurality of users, wherein the client executed at the user terminal of the first user comprises means for selecting the contact information of other users in the plurality of users from the contact information list, means for choosing to synchronise the contact information, means for generating an invitation message, including an invitee list of users belonging to the plurality of users, and means for transmitting the invitation message from the client executed on the user terminal of the first user to the client executed on the user terminal of each of the other users in the plurality of users; and
  a user terminal of at least one of the other users in the plurality of users, wherein the client executed at the user terminal of the at least one other users comprises means for receiving the invitation message, and means for accepting the invitation message, wherein the means for accepting comprises means for generating an acceptance message, said acceptance message giving authorisation to the plurality of users to contact the at least one other user, means for broadcasting said acceptance message to the plurality of users, and means for adding the invitee list to the contact information list of the at least one other user, thereby synchronising the contact information of the plurality of users of the telephony system.

14. A system according to claim 13, wherein the means for transmitting the invitation message comprises: means for sending the invitation message to the client of each user in the plurality of users that is online; means for storing the invitation message at the client of each user that is online and has accepted the invitation; and means for forwarding the invitation message to the client of any user in the plurality of users that subsequently comes online from at least one of the clients storing the invitation or the first user.

15. A system according to claim 13, wherein the means for receiving further comprises means for displaying the invitee list on the user terminal of the at least one other user in the plurality of users.

16. A system according to claim 15, wherein said invitation message further includes text information entered by the first user and said means for displaying further comprising displaying the text information on the user terminal of the at least one other user in the plurality of users.

17. A system according to claim 15, wherein the means for displaying further comprises means for offering the at least one other user in the plurality of users the choice to accept or refuse the invitation message.

18. A system according to claim 17, wherein the user terminal of the at least one of the other users in the plurality of users further comprises means for refusing the invitation message, said means for refusing comprising means for generating a refusal message and means for broadcasting the refusal message to the plurality of users.

19. A system according to claim 13, wherein the means for broadcasting the acceptance message comprises: means for sending the acceptance message to the client of each user in the plurality of users that is online; means for storing the acceptance message at the client of each user that is online and has accepted the invitation; and means for forwarding the acceptance message to the client of any user in the plurality of users that subsequently comes online from at least one of the clients storing the invitation or the at least one user.

20. A system according to claim 13, wherein the client of each user of the plurality of users further comprises means for adding at least one new user to the plurality of users, said means for adding comprising:

means for selecting at least one new user from the contact information list to add to the plurality of users; and means for transmitting an invitation message to the at least one new user, said invitation message including a list of the users in the plurality of users.

21. A system according to claim 20, wherein the client of the at least one new user comprises:

means for receiving the invitation message at the at least one new user, the at least one new user choosing to accept or refuse the invitation message, if the at least one new user chooses to accept the invitation, means for broadcasting an acceptance message to the clients of the users of the plurality of users, wherein, upon receiving the acceptance message, the users of the plurality of users can choose to remain in the plurality of users with the at least one new user or leave the plurality of users; and if the at least one new user chooses to refuse the invitation, means for broadcasting a refusal message to the users of the plurality of users.

22. A system according to claim 13, wherein the client of each user of the plurality of users further comprises means for renaming the plurality of users, said means for renaming comprising means for entering a new name for the plurality of users in the client, means for broadcasting the new name to the client of each user of the plurality of users; and means for updating the name stored for the plurality of users in the contact information list.

23. A system according to claim 13, wherein the client of each user of the plurality of users further comprises means for leaving the plurality of users comprising means for selecting to remove the plurality of users from the contact information list; means for choosing whether to keep contacts of the users in the plurality of users in the contact information list or to remove the contacts of the users in the plurality of users; and means for broadcasting a leaving message to the client of each of the users of the plurality of users.

* * * * *